W. A. RIDER.
TRACTOR TRANSMISSION.
APPLICATION FILED DEC. 9, 1914.

1,184,874.

Patented May 30, 1916.
3 SHEETS—SHEET 3.

UNITED STATES PATENT OFFICE.

WILLIAM A. RIDER, OF LOS ANGELES, CALIFORNIA, ASSIGNOR, BY MESNE ASSIGNMENTS, TO BULKLEY RIDER TRACTOR CORPORATION, OF LOS ANGELES, CALIFORNIA, A CORPORATION OF CALIFORNIA.

TRACTOR TRANSMISSION.

1,184,874. Specification of Letters Patent. Patented May 30, 1916.

Application filed December 9, 1914. Serial No. 876,266.

*To all whom it may concern:*

Be it known that I, WILLIAM A. RIDER, a citizen of the United States, residing at Los Angeles, in the county of Los Angeles, State of California, have invented new and useful Improvements in Tractor Transmissions, of which the following is a specification.

The invention relates to a variable speed transmission and drive for tractors.

In the operation of tractors such as are employed for hauling heavy loads there are times when the tractor is subjected to extraordinary conditions as in hauling unusually heavy loads and climbing steep grades, at other times they operate under ordinary working conditions and when running light or without a load they operate under other conditions.

It is the object of this invention to provide a change speed transmission and driving mechanism which is particularly adapted for use on tractors and which will permit of variations of speed and power transmission according to the various conditions to which the tractor is subjected.

Another object is to provide a transmission and driving mechanism having a plurality of sets of variable speed transmission gears, one of which sets is employed to propel the tractor at high, low or intermediate speeds and reverse in the usual well known manner when the tractor is running light or without a load, and the other set employed in conjunction with the first set when it is necessary to obtain a greater speed reduction, and increased driving power when propelling the tractor under extraordinary loads or up steep grades.

A further object is to provide means for connecting the differential casing on the driving shaft to such shaft to obviate differential movement of the shaft and the driving wheels geared thereto, and thereby equalize the strains on the driving wheels when operating under extreme conditions.

A further object is to provide an effective arrangement of the transmission mechanisms and the connections therewith to the tractor wheels, whereby a short wheel base may be obtained.

Figure 1:
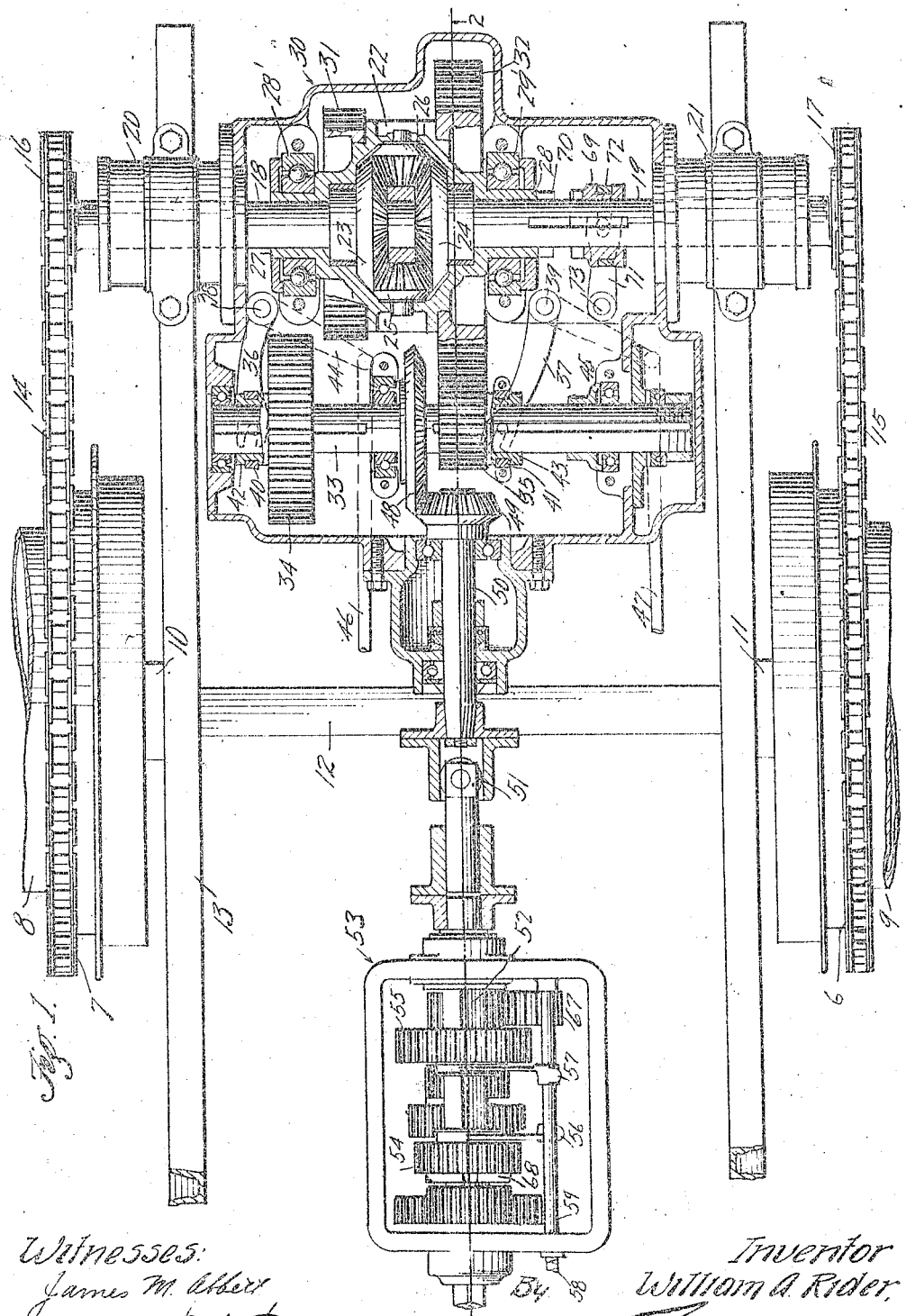
Figure 2:
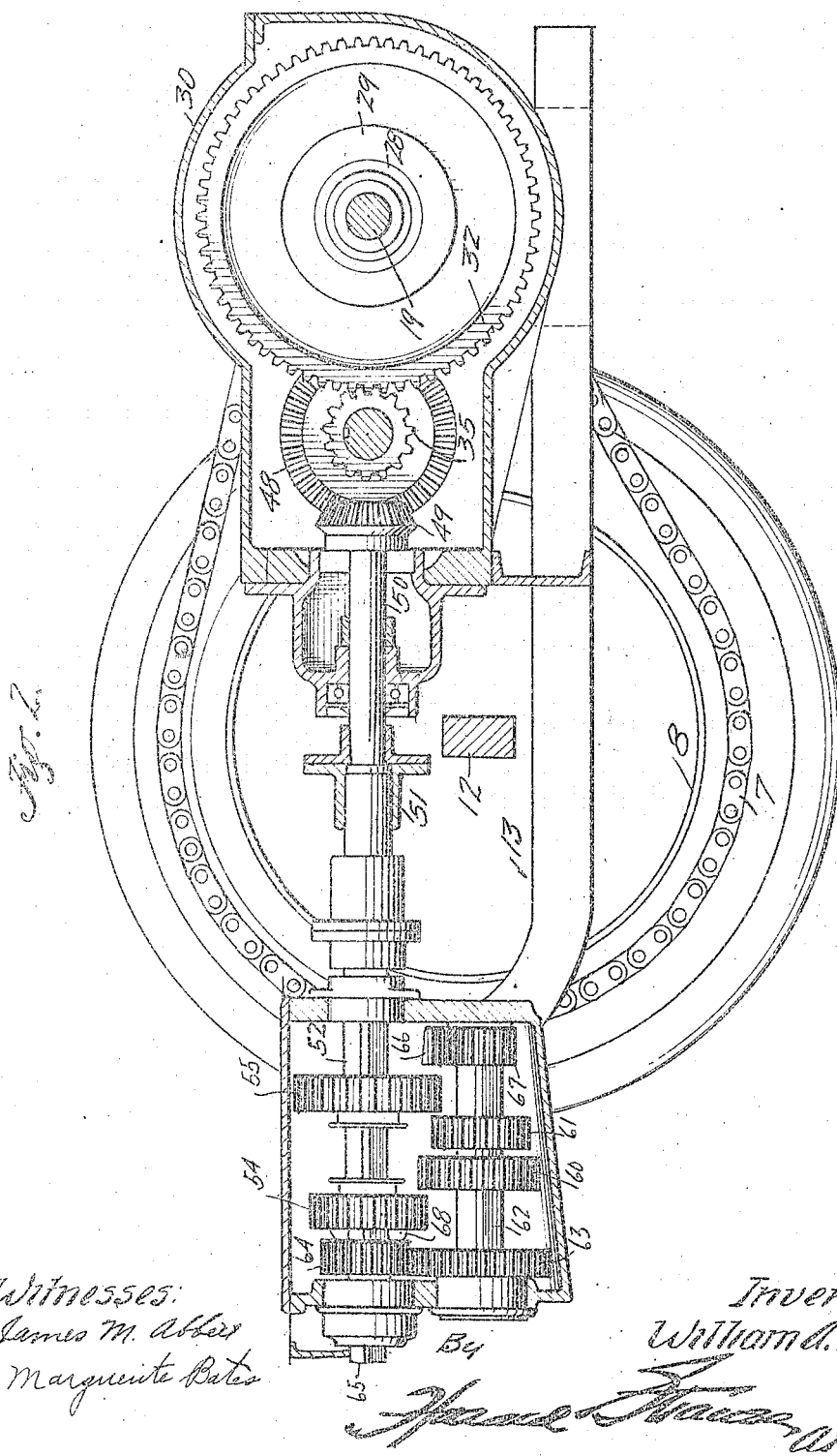
Figure 3:
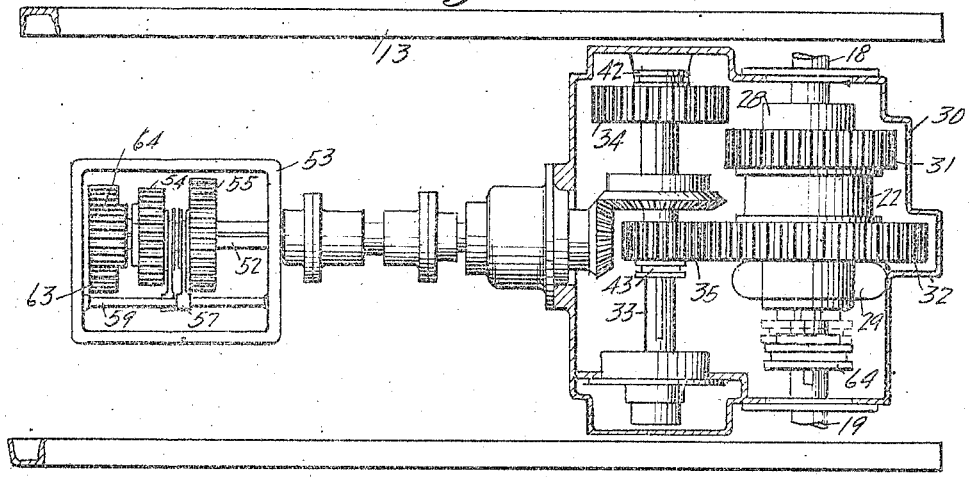
Figure 4:
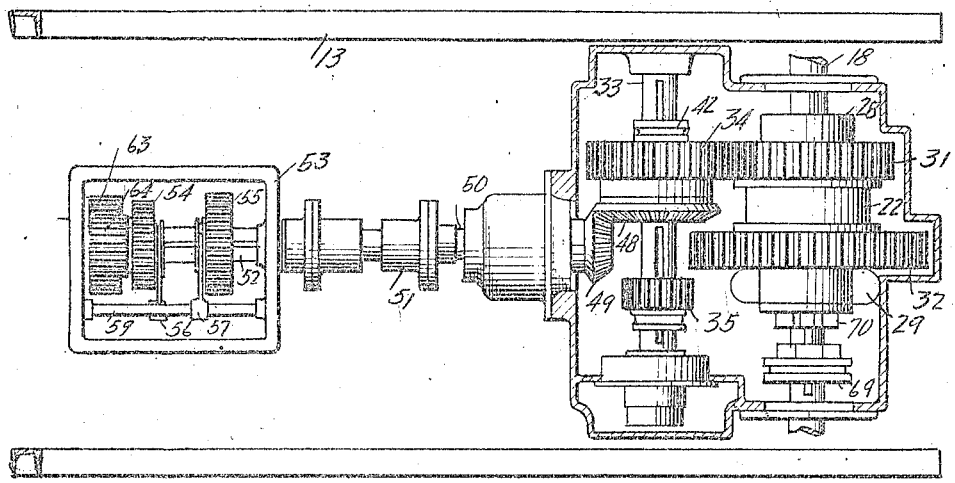

The invention is illustrated in the accompanying drawings, in which:

Figure 1 is a plan view of the transmission mechanism partly in section and with parts broken away. Fig. 2 is a vertical section and elevation on the line 2—2 of Fig. 1. Fig. 3 is a diagram in plan illustrating the transmission mechanism as arranged on the extreme low speed to transmit the maximum high power to the driving and propelling shafts of the tractor, when hauling a heavy load or climbing a steep grade. Fig. 4 is a diagram in plan illustrating the transmission mechanism arranged to drive the tractor on high speed when hauling a light load or operating without a load.

More specifically, 6 and 7 indicate the driving sprockets on the tractor wheels, the hubs 8 and 9 of which are revolubly mounted on suitable spindles 10 and 11 mounted on the rear axle 12 connected in any desired manner to the tractor frame 13. Passing around the sprocket wheels 6 and 7 are rearwardly extending sprocket chains 14 and 15 which pass around sprocket wheels 16 and 17 mounted on the differential driving shafts 18 and 19 carried in suitable bearings 20 and 21 mounted on the tractor frame 13 rearward of the rear axle 12. The inner ends of the propelling shafts 18 and 19 terminate in the differential casings 22 and have the usual differential gears 23 and 24 rigidly mounted thereon which mesh with the pinions 25 and 26 revolubly mounted on the differential casing 22. The differential casing 22 is formed with hubs 27 and 28 which encircle the shafts 18 and 19 and are supported in suitable anti-friction bearings 28' and 29' mounted in a housing 30 supported on the frame 13 in any desired manner.

Rigidly mounted on the differential casing 22 is a pair of spaced spur gears 31 and 32 of different diameters; the gear 31 being of less diameter than the gear 32 and arranged on the side of the differential casing 22 adjacent the shaft 18. Mounted in suitable bearings in the housing 30 and extending parallel with the shafts 18 and 19 is a shaft 33 on which a pair of separately shiftable gears 34 and 35 are splined. The gear 34 is of a diameter larger than the gear 35 and is adapted to be moved in and out of engagement with the gear 31, while the gear 35 is adapted to move in and out of engagement with the gear 32. The gears 34 and 35 are shifted by the customary gear-shifting mechanisms commonly employed in change speed transmissions, here indicated as consisting of forked arms 36 and 37 carried on rock shafts 38 and 39 and engaging straps 40 and 41 mounted in annular grooves on the hubs 42 and 43 of the gears 34 and 35. The rock shafts 38 and 39 are provided with arms 44 and 45 attached to connecting rods 46 and 47 leading to any suitable operating mechanism by which the manual actuation thereof will effect the shifting of the gears 34 and 35 in and out of mesh with the gears 31 and 32 as desired.

The shaft 33 has a beveled gear 48 rigidly mounted thereon which meshes with a beveled pinion 49 carried by a short shaft 50 supported in suitable bearings carried by the housing 30 and connecting at its outer end to a universal joint 51 to a driving shaft 52 extending into a gear case 53. Splined on the shaft 52 within the gear case 53 is a pair of differential diametered transmission gears 54 and 55 adapted to be shifted longitudinally of the shaft 52 by means of arms 56 and 57 on longitudinally shiftable shafts 58 and 59 adapted to be operated manually in any suitable manner.

The gears 54 and 55 are designed to be thrown in and out of mesh with gears 60 and 61 rigidly mounted on a lay shaft 62 supported in suitable bearings in the housing 53 as is common in ordinary transmission mechanisms; the lay shaft 62 being adapted to be driven continuously through a gear 63 rigidly mounted thereon which meshes with a pinion 64 on an engine crank shaft 65. The gear 55 is also designed to be thrown into mesh with an idler gear 66 in constant mesh with a pinion 67 on the lay shaft 62 to reverse the direction of rotation of the shaft 52 and its connected parts.

The gear 55 is of a larger diameter than the gear 61 so that when thrown into mesh with the latter the shaft 52 will be rotated at a slower speed than the lay shaft 62 which in turn is driven at a slower speed than the crank shaft 65 by reason of the gear 63 being of larger diameter than the gear 64. The gears 54 and 60 are approximately of equal diameters and when in mesh with each other the shaft 52 will be rotated at an intermediate speed. To drive the shaft 52 at a high speed the gear 54 is shifted toward the gear 64 so that clutch teeth 68 on the adjacent faces of the gears 54 and 64 will be thrown into mesh, thereby connecting the shaft 52 directly to the shaft 65.

It will now be seen that by shifting the gears 54 and 55 in the case 53 three speeds and reverse rotation may be transmitted to the driving shaft 52 from the crank shaft 65 and that by shifting the gears 34 and 35 in the case 30 the number of speeds at which the tractor wheels may be driven can be increased to six.

In the operation of the invention, when the tractor is running light or not hauling a load and it is desirable to propel it at high speed the gear 34 is thrown into mesh with the gear 31 and the gear 54 is shifted toward the gear 64 so that the clutch teeth 68 engage. The drive will then be directed from the crank shaft 65 to the driving shafts 18 and 19 through the shafts 52, 50, pinion 49, gear 48, shaft 33 and gears 34 and 31. The speed of rotation of the driving shafts 18 and 19 may be varied while the gears 34 and 31 are in mesh by shifting the gears 54 and 55 into intermediate and low speeds as is common in transmission mechanisms.

When the tractor is to be driven under a heavy load or up steep inclines the gear 34 is thrown out of mesh with the gear 31 and the gear 35 is thrown into engagement with the gear 32. Various speeds of rotation may be transmitted to the driving gear 35 by shifting of the gears 54 and 55 as before described. When the load is extraordinarily great and it is desired to apply the maximum driving power to the tractor wheels the gear 55 is engaged with the gear 61 while the gear 35 is in mesh with the gear 32. The drive from the engine shaft 65 will then be through the gears 64 and 63, lay shaft 62, gears 61 and 55, shafts 52 and 50, gears 49 and 48, shaft 33 and gears 35 and 32, thus effecting a considerable speed reduction and a consequent increased driving power to the shafts 18 and 19 and the tractor wheels.

Where the opposing strains on the tractor wheels are such as to tend to rotate one of the tractor wheels rearwardly while the other is driving forwardly, which is rendered possible by the differential gears on the shafts 18 and 19, it is desirable to lock the differential gears so that the shafts 18 and 19 may be driven directly and positively. This is effected by throwing a clutch member 69 keyed on the shaft 19 into engagement with clutch teeth 70 formed on the hub 28 of the differential casing 22, thereby locking the latter to the shaft 19 so that when the differential casing 22 is rotated through either gear 31 and 32 thereon the shaft 19 will be driven directly therewith; the shaft 18 being driven in unison with the shaft 19 through the interlocking of the gears 23, 24, 25 and 26. The shifting of the clutch member 69 is accomplished by means of a yoke 71 engaging a strap 72 mounted in an annular groove formed in the clutch member 69; the yoke 71 being mounted on a rock shaft 73 which may be operated in any desired manner.

In the application of the invention the set of transmission gears in the case 53 are arranged on the forward side of the rear axle 12 and the set of gears in the case 30 are arranged on the rear side of the axle 12 with the connections between the drive shaft sections 18 and 19 and the tractor wheel hubs 8 and 9 leading forward to the latter. By this arrangement a short wheel base is obtained.

What I claim is:

In a tractor, the combination with a frame, a rear axle upon which said frame is mounted, supporting ground wheels upon said rear axle, a casing mounted upon said frame in the rear of the rear axle, a combined change speed and differential mechanism mounted in said casing, means for driving from the differential mechanism to the ground wheels, a change speed gearing mounted in advance of said rear axle, a prime mover for actuating said last named change speed gearing and a universal connection between the last named change speed gearing and the combined change speed gearing and differential mechanism.

In witness that I claim the foregoing I have hereunto subscribed my name this 12th day of June, 1914.

W. A. RIDER.

Witnesses:
MARGUERITE BATES,
MARIE BATTEY.